United States Patent [19]

Miessler et al.

[11] 4,040,165
[45] Aug. 9, 1977

[54] METHOD OF MAKING SYNTATIC MODULES

[75] Inventors: James D. Miessler, Westfield; Arne I. Johnson, Springfield, both of Mass.

[73] Assignee: Albany International Corporation, Albany, N.Y.

[21] Appl. No.: 734,954

[22] Filed: Oct. 22, 1976

[51] Int. Cl.$^2$ .................... B23P 3/00; B23P 25/00
[52] U.S. Cl. .......................................... 29/458; 9/8 R; 29/DIG. 46; 29/463; 138/149; 264/109; 264/128; 264/46.6; 264/294
[58] Field of Search ................ 29/458, 463, DIG. 46; 9/8 R; 138/149; 264/109, 128, 46.9, 46.5, 46.6, 294, DIG. 6

[56] References Cited

U.S. PATENT DOCUMENTS

| | | | |
|---|---|---|---|
| 2,358,535 | 9/1944 | Reymond et al. | 264/294 |
| 2,985,411 | 5/1961 | Madden | 29/DIG. 46 UX |
| 3,258,511 | 6/1966 | McGregor, Jr. | 29/463 UX |
| 3,353,981 | 11/1967 | Jacob | 264/DIG. 6 UX |
| 3,608,010 | 9/1971 | Stayner | 264/128 X |
| 3,622,437 | 11/1971 | Hobaica | 9/8 R X |
| 3,705,432 | 12/1972 | Watkins | 9/8 R |
| 3,729,756 | 5/1973 | Cook et al. | 9/8 R |
| 3,763,548 | 10/1973 | Anderson | 264/46.7 X |
| 3,978,176 | 8/1976 | Vaegeli | 264/128 X |
| 3,996,654 | 12/1976 | Johnson | 29/458 |

*Primary Examiner*—Charlie T. Moon

[57] ABSTRACT

An improved method of making syntatic modules which includes the following steps. A preform mold and a casting mold are formed of predetermined configuration. A woven roving of predetermined size is formed to provide a skin. Additionally a layer of spacer material is formed which includes a plurality of voids. The roving is attached to the spacer material to form a laminate. The laminate is formed to the insidewalls of the preform mold and then the preform mold is filled with a plurality of hollow balls. A thin layer of resin is poured into the preform mold to connect the balls. The composite is removed from the preform mold and placed into the casting mold after spacer material is attached to the exposed end portions of the composite. A syntatic foam resin is added to the casting mold interior so as to fill all spaces between the balls and all voids in the spacer material. The syntatic foam resin is then cured and the mold parts are removed thereby producing a module.

12 Claims, 13 Drawing Figures

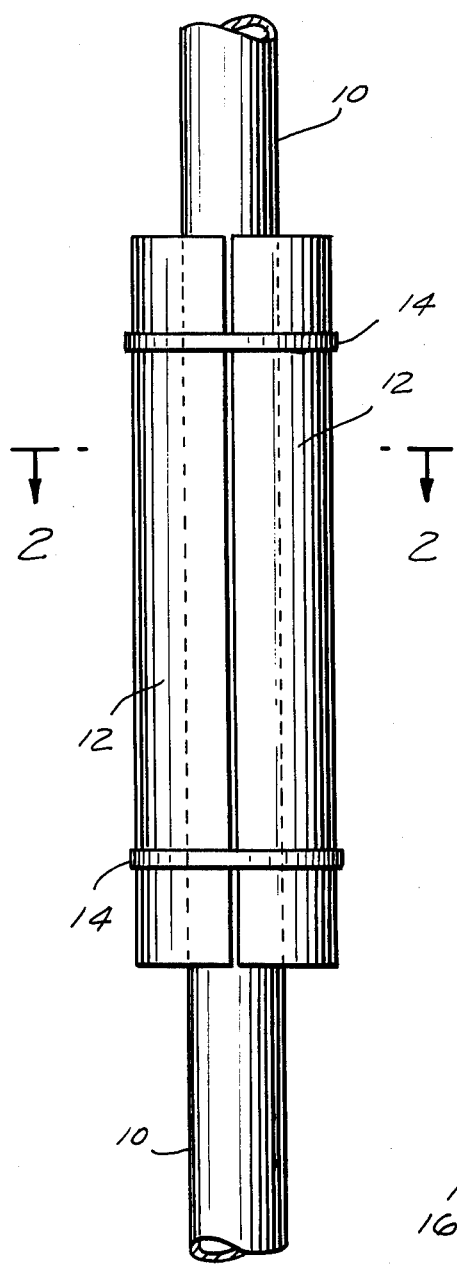
FIG. 1
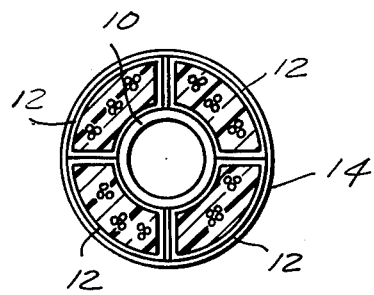
FIG. 2
FIG. 3
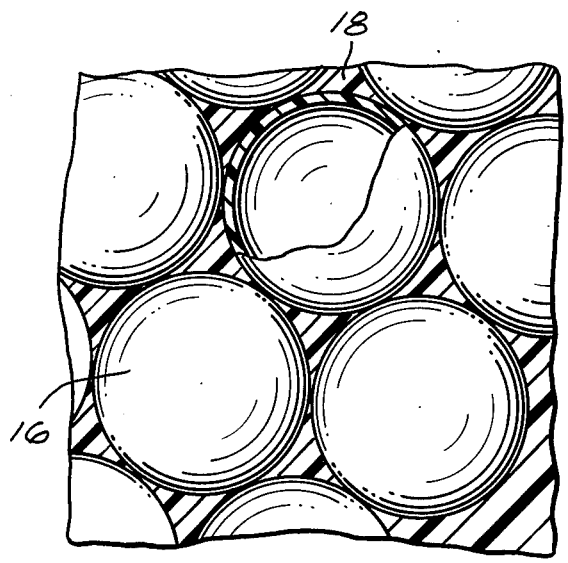

FIG. 11
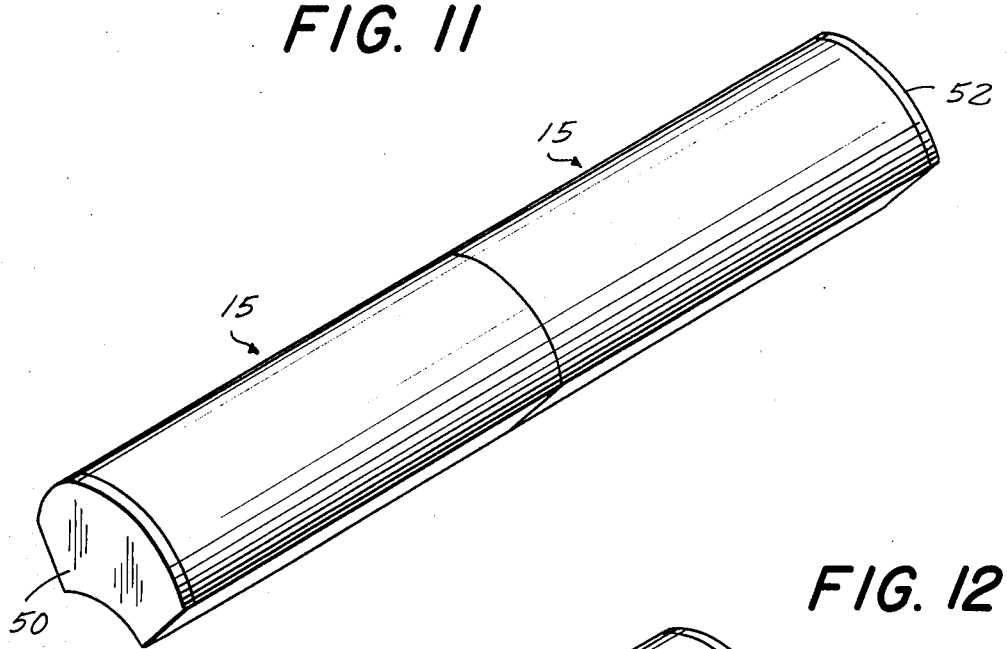
FIG. 12
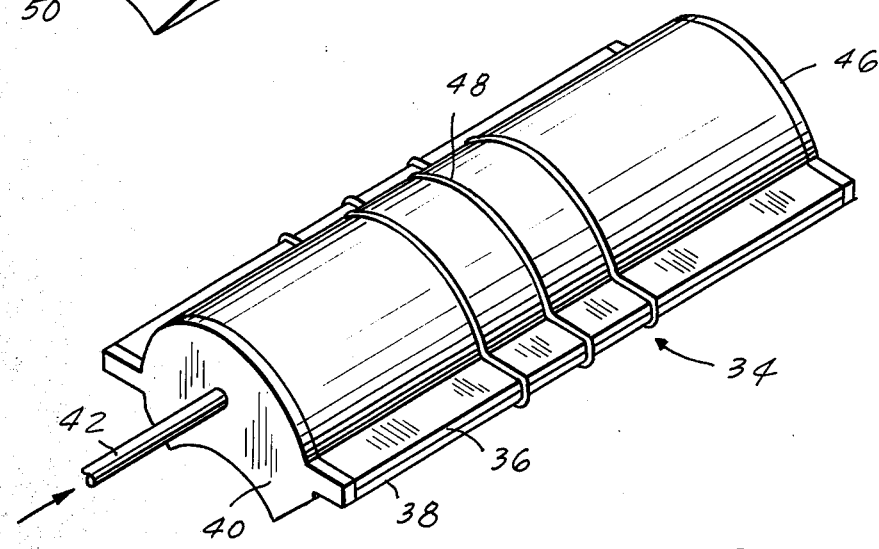
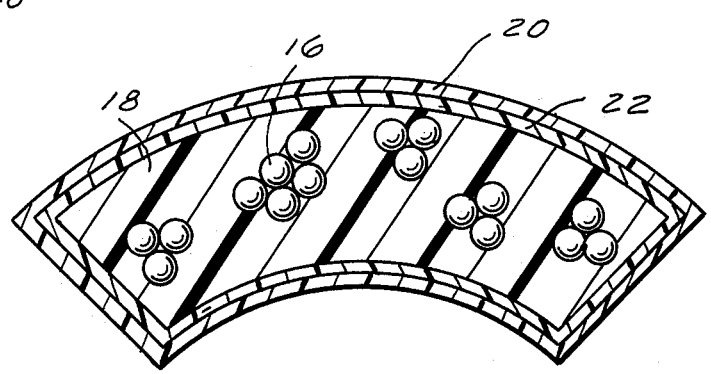
FIG. 13

METHOD OF MAKING SYNTATIC MODULES

BACKGROUND OF THE INVENTION

The present invention relates to an improved molding method and in particular to a method of making syntatic modules.

In U.S. Pat. No. 3,622,437 there is disclosed a composite buoyancy material for use in a variety of underwater environments. The material in that patent is disclosed as a syntatic foam filled with a plurality of hollow spheres or beads.

An improved method of forming the buoyancy material is disclosed in pending application Ser. No. 601,983 filed Aug. 5, 1975, now Pat. No. 3,966,654. Further improvements in the manner and sequence of manufacturing the syntatic modules are always desirable for the purpose of deriving an improved resultant product. The ultimate product is designed for effective use in environments such as the formation of jackets to be secured to the outside of pipes, drill sections, or the like for use at off-shore oil installations or in other deep sea locations for buoyancy purposes.

SUMMARY OF THE INVENTION

With the above discussion in mind, it is among the primary objectives of the present invention to provide an improved method for making syntatic modules. The method includes the steps of forming a preform mold having a surfaces defining a cavity of a desired configuration and forming a casting mold having surfaces defining a cavity of the desired module configuration. A woven roving of predetermined size is formed to provide a skin. A layer of spacer material containing a plurality of voids is formed of predetermined size. The roving is attached to the spacer material to form a laminate. The laminate is formed to the sidewalls of the top half and bottom half of the preform mold and the preform mold is then closed and filled with a plurality of hollow balls. A thin layer of resin is poured into the preform to connect the balls. Thereafter, the composite is removed from the preform mold and placed into the casting mold where the two exposed ends of the composite are fitted with coverings of spacer materials. Thereafter, the ends of the casting mold are capped and a syntatic foam resin is added into the casting mold interior so as to fill all spaces between the balls and all voids in the spacer material. Finally, the syntatic foam resin is cured and the mold parts are removed so as to produce the modules.

It has been found effective to employ a glass fiber material for the removing for strength reinforcement with the glass fiber cut to the size necessary for the skin. The spacer material can be a synthetic fiber mat with a resin binder also cut to the desired size. The roving is attached to the mat in an acceptable fashion such as by sewing one to the other.

It has been found effective, primarily for ease of handling, to make the preform mold approximately one half the length of the casting mold and to heat form the composite roving and mat to the preform. This can be accomplished by use of a heat gun.

Appropriate surface treatments can be applied to the modules for protection against abrasion and the like.

With the above objectives among others in mind, reference is made to the attached drawings.

BEIEF DESCRIPTION OF THE DRAWINGS

In The Drawings:

FIG. 1 is a side elevation view of a section of pipe or the like encased in a syntatic module formed in accordance with the present invention;

FIG. 2 is a sectional view taken along the plane of lines 2—2 of FIG. 1;

FIG. 3 is an enlarged fragmentary view of the syntatic material;

FIG. 11 is a perspective view of the patterned end mats to be attached to the composite before it is placed into the casting mold;

FIG. 12 is a perspective view of the casting mold with an arrow showing the direction of introduction of syntatic foam into the mold cavity; and FIG. 13 is a cross sectional view of a module section after the casting mold has been removed.

DESCRIPTION OF THE PREFERRED EMBODIMENT

Figure 4:
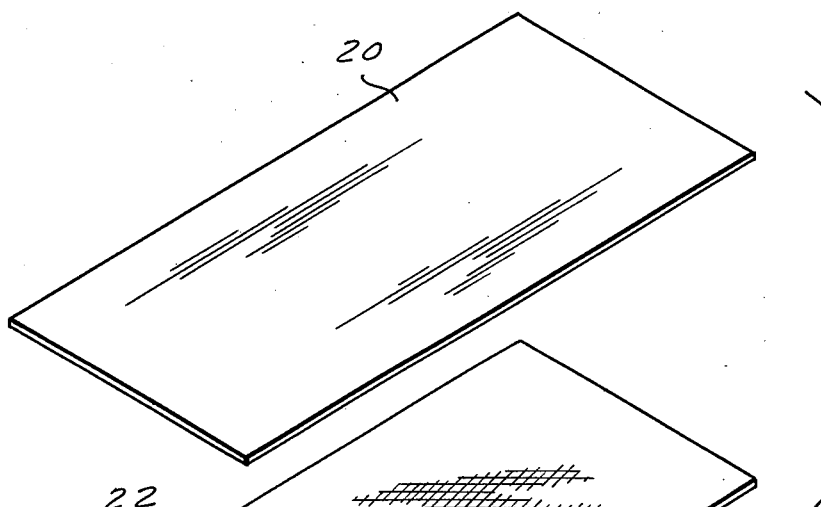
FIG. 4 is an exploded perspective view of the roving and mat portions of the module.

FIG. 1 shows a pipe 10 or the like encased within a jacket formed of a plurality of syntatic modules 12 held together by bands 14. The modules could comprise 90° sections as shown in FIG. 2 or could be of varied arc length up to 180°. The jackets serves to render the pipe buoyant notwithstanding the great weight of the pipe and the extreme pressures to which the pipe may be subjected in deep sea environment. The jacket is formed of a buoyant material and, as shown in FIG. 3, comprises a plurality of hollow spheres 16 embedded in a matrix of syntatic foam 18 such as that disclosed in U.S. Pat. No. 3,622,437.

The steps performed in forming the modules 12 are illustrated in FIGS. 4–12. Accordingly, as a first step, a rectangular sheet of woven roving 20 is cut to a predetermined size for the section. It has been found that glass fiber material provides reinforcing strength when used in formation of the woven roving 20. A spacer mat 22 is cut to a similar predetermined rectangular size to mate with the roving 20. The mat is provided with appropriate voids to facilitate adherence of the balls placed in contact therewith at a later step in the manufacturing procedure, to allow penetration thereof by the syntatic foam resin, and also serves to space the balls from the surface skin formed by roving 20. A conventional synthetic fiber mat with a resin binder has been found to work effectively for spacer mat 22.

Figure 5:
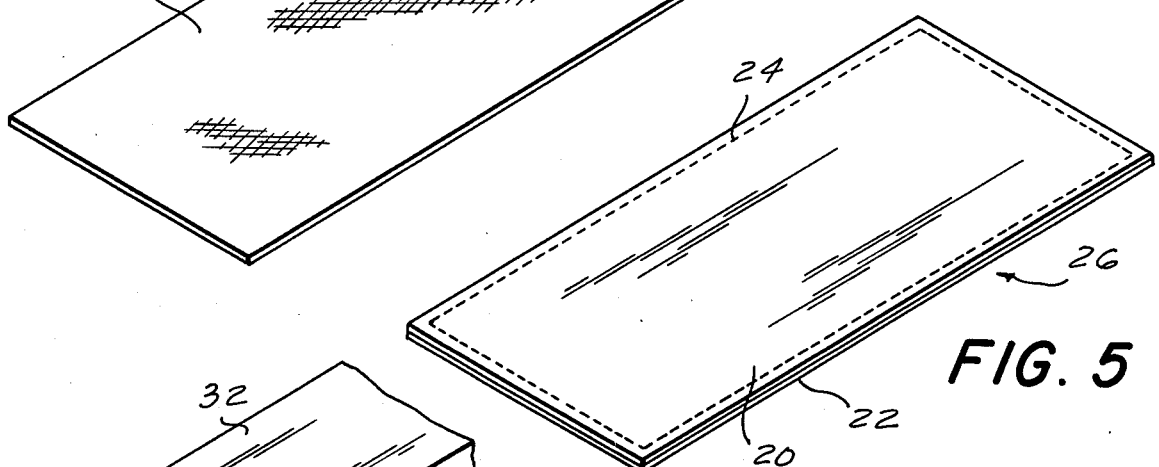
FIG. 5 is a perspective view of the roving and mat portions of the module in laminate condition.
Figure 7:
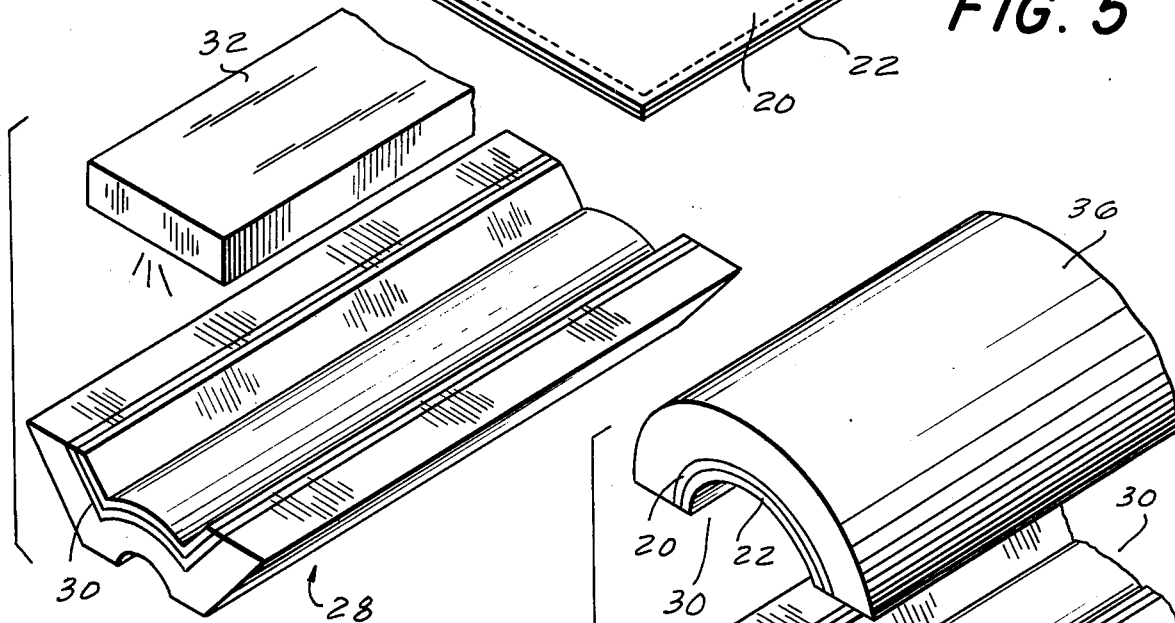
FIG. 7 is a perspective view of the heat forming step for the laminate in the bottom half of the preform mold.
Figure 6:
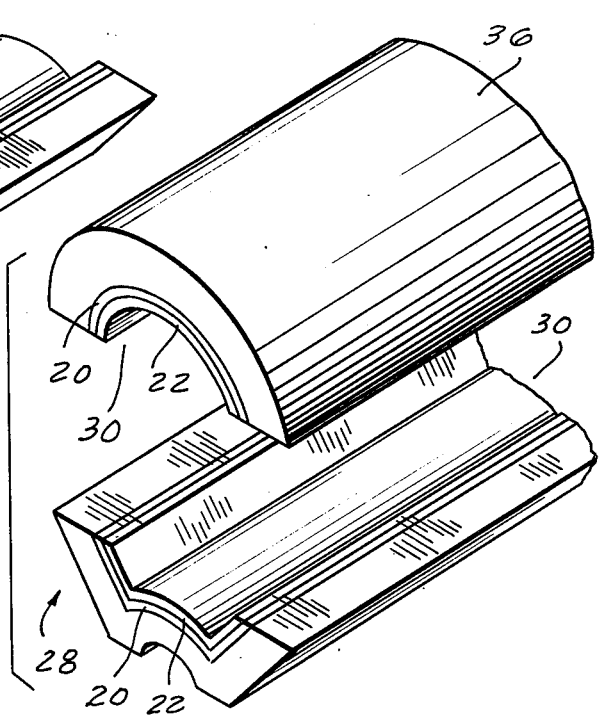
FIG. 6 is a fragmentary perspective view of the top and bottom halves of the casting mold with the laminate in place.

As depicted in FIG. 5, the roving 20 and the spacer mat 22 are then attached to one another by sewing them together as indicated by the stitches 24 around the periphery of the adjoining edges. Naturally the mat and roving can be attached in other convenient substitute ways in lieu of the stitching employed in the depicted embodiment. The resultant laminate 26 of roving and mat is then in condition for acceptance within either the top or bottom half of preform mold 28 and another similar laminate 28 is made for the other half. The preform mold is approximately one half the length of the ultimate casting mold and has an appropriate cavity 30 for reception of the laminates 26 therein and to preform the composite before the final casting step. The rectangular laminates 26 are placed in the preform mold half sections as shown in FIG. 6. Heat from an appropriate heat forming source is then applied as shown in FIG. 7 so that the laminates conform to the shape of cavity 30 in preform mold 28.

Figure 8:
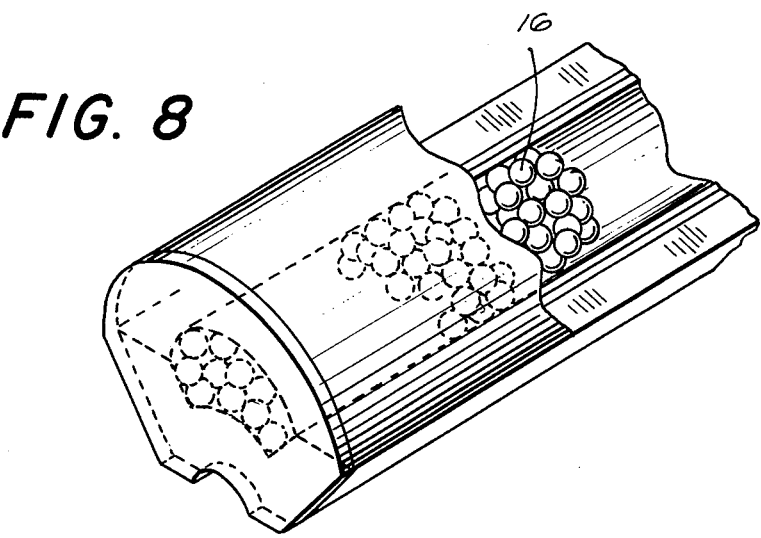
FIG. 8 is a perspective view with cut away section of the hollow balls being placed in the preform mold.
Figure 9:
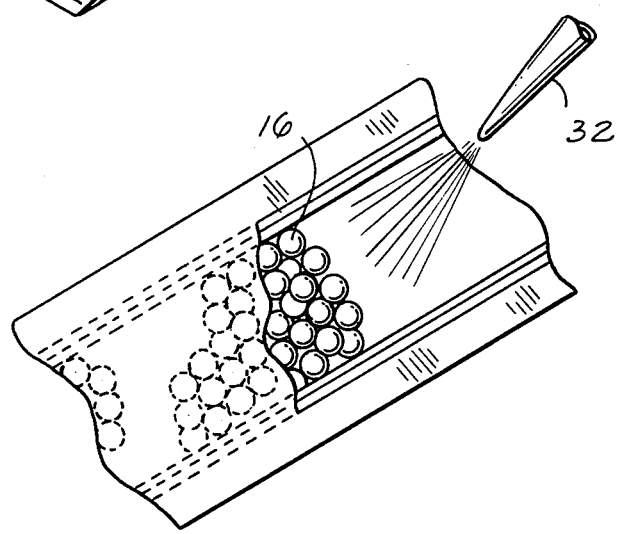
FIG. 9 is a perspective view with a cut away section of the step of applying resin the hollow balls inside the laminate in the preform mold.
Figure 10:
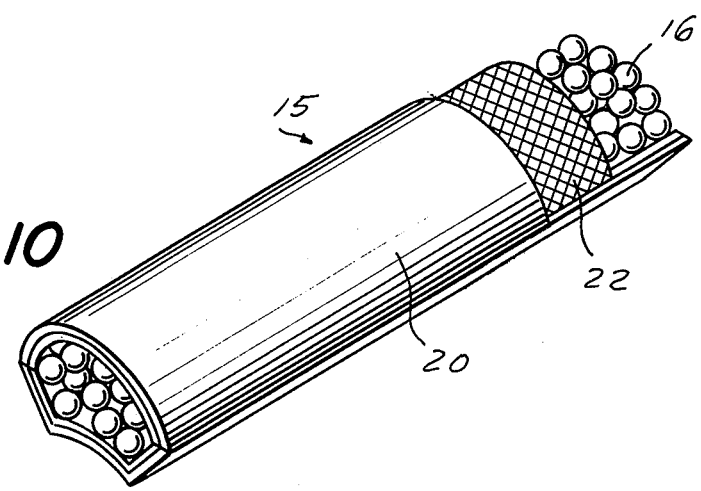
FIG. 10 is a perspective view, with cut away sections, of the composite after removal from the preform mold before peices of the mat are fitted and attached to the exposed end cross sections.

Thereafter, as shown in FIG. 8, the heat formed laminate 26 is held within preform mold 28 is filled with the hollow spheres or balls 16 and as shown in FIG. 9 a spray source 32 pours a thin layer of resin onto the balls and about the surface of laminates 26 to form the composite 15 which is shown in FIG. 10 after removal from the preform mold 28.

The composite is placed in the final casting mold 34, after attaching end mats 50 and 52 shown in FIG. 11. The respective top and bottom halves of casting mold 34 conforms generally to the shape of the top and bottom halves of preform mold 28 and the top and bottom surfaces of the composite.

Two composites of similar construction are then placed in end to end alignment and terminal sections 50 and 52, of a composition similar to mat 22, are attached to the exposed ends of the composites as shown in FIG. 11. Said terminal sections are cut to the same shape as the cross section of the composites. The two composites are then placed in the casting mold 34 while maintaining their end to end alignment. It is convenient to refer to the casting mold 34 as having a female section 36 which corresponds to cross section to the top half and a male section 38 which corresponds in cross section to the bottom half of the preform mold. The preform mold and the casting mold are formed in a conventional fashion such as that described in connection with the above referenced disclosres.

The male and female sections 38 and 36 of the casting mold 34 are then respectively closed over the geometrically conforming surfaces of the composites 15 and a bottom plate 40 having an inlet manifold 42 is attached to the lower end of the mold 34. A top end plate 46 is attached to the open top end of the mold whereafter a syntatic foam made up of glass microballons, epoxy resins, and an epoxy hardener is pumped through the bottom plate manifold until the mold is completely full. It has been found that a restraining cage 48 may be applied around the mold to prevent warpage of the molds during the pumping process. The syntatic foam is pumped through the bottom plate until the mold is completely full including all spaces between adjacent balls as well as the cells of mat and roving composite 26. The pumping is performed under pressure from the bottom of the upright mold allowing complete dissemination of the foam material up and around all the balls. This helps to prevent voids which are created when pouring is conducted from the top of the mold relying on gravity to pull the viscous material into the voids around and under the balls.

After the mold cavity is filled with the syntatic foam, a vent in the top end plate 46 is plugged and the pump removed from the bottom manifold 42 and the manifold orific plugged. Thereafter, the modules are allowed to cure after which they are removed from the mold resulting in a module 12 of the desired shape.

As a final step, a tough outer skin may be applied to the module. The skin serves to protect the module from abrasions and impact when the module is handled. The skin could, for example, comprise a combination of chopped fiber glass and a polyester resin. Since the skin coat does not have the buoyancy of the syntatic foam, it is desirable to keep the skin as thin as practical so as not to reduce the floatation properties of the module. A skin on the order of 0.080 inch has been found to be satisfactory.

It should also be noted that when the balls are placed in the preform mold, it has been found beneficial to vibrate the preform mold 28 in order to settle a maximum number of balls within the preform mold cavity.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim

1. The method of providing a pipe member with syntatic modules as floatation devices comprising the steps of:
    a. forming a hollow preform mold having surfaces defining a cavity of desired configuration and forming a casting mold having surfaces defining a cavity of similar cross section including an arcuately convex surface for forming one surface of said modules with an arcuately concave surface thereof;
    b. forming a woven roving of predetermined size to provide a skin;
    c. forming a layer of spacing material of predetermined size and containing a plurality of voids therein;
    d. attaching the roving to the spacer material to form a laminate thereof;
    e. forming the laminate to the inside walls of the preform mold;
    f. filling the preform mold with a plurality of hollow balls;
    g. pouring a thin layer of resin into the preform mold to connect the balls and form the composite;
    h. removing the composite from the preform mold and placing end sections of spacing material thereon before placing it into the casting mold;
    i. adding a syntatic foam resin into the casting mold interior so as to fill all spaces between the balls and all voids in the spacer material;
    j. curing said syntatic foam resin and removing said mold parts so as to produce a module;
    k. repeating steps *b* through *j* to produce additional like modules; and
    1. assembling said module segments around said pipe with the concave surfaces of said modules adjacent said pipe.

2. The method of making syntatic modules comprising the steps of:
    a. forming a hollow preform mold having surfaces defining a cavity of desired configuration and forming a hollow casting mold having surfaces defining a cavity of the desired module configuration;

b. forming a woven roving of predetermined size to form a skin;
c. forming a layer of spacer material containing a plurality of voids and being of predetermined size;
d. attaching the roving to the spacer material to form a laminate thereof;
e. forming the laminate to the perform mold;
f. filling the preform mold with a plurality of hollow balls;
g. pouring a thin layer of resin into the preform mold to connect the balls and form a composite;
h. removing the composite from the preform mold and attaching spacer material sections to the ends and placing into the casting mold;
i. adding a syntatic foam resin into the casting mold interior so as to fill all spaces between the balls and all voids in the spacer material; and
j. curing said syntatic foam resin and removing said mold parts so as to produce said modules.

3. The invention in accordance with claim 2 wherein the woven roving is of a glass fiber material.

4. The invention in accordance with claim 2 wherein the spacer material is a synthetic fiber mat with a resin binder.

5. The invention in accordance with claim 2 wherein the roving is attached to the spacer material by sewing them together to form the composite.

6. The invention in accordance with claim 2 wherein the preform mold is one half the length of the casting mold.

7. The invention in accordance with claim 2 wherein the composite is formed to the inside walls of the preform mold by heat forming.

8. The invention in accordance with claim 2 including the step of applying surface treatment to the syntatic module for protective purposes.

9. The invention in accordance with claim 2 wherein the syntatic foam is pumped into the casting mold when the casting mold is a substantially upright position.

10. The invention in accordance with claim 2 wherein the casting mold has an open top end and an open bottom end and comprising the further steps of closing the bottom end with an end provided with a manifold, and closing the top end with an end plate vented to atmosphere with the syntatic foam resin being introduced through the manifold.

11. The invention in accordance with claim 2 wherein the manifold extends through a manifold orifice and said top end plate is provided with an air vent and comprising the further steps of removing said manifold and blocking said orifice and vent hole after adding said syntatic foam to said cavity.

12. The invention in accordance with claim 2 wherein the preform mold is vibrated while filling with said balls.

* * * * *